(12) United States Patent
Hemphill et al.

(10) Patent No.: US 9,688,127 B2
(45) Date of Patent: Jun. 27, 2017

(54) VEHICLE ACCESSORY ATTACHMENT SYSTEM

(71) Applicant: FORD GLOBAL TECHNOLOGIES, LLC, Dearborn, MI (US)

(72) Inventors: Joshua Robert Hemphill, White Lake, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/947,497

(22) Filed: Nov. 20, 2015

(65) Prior Publication Data

US 2017/0144520 A1 May 25, 2017

(51) Int. Cl.
*B60J 7/10* (2006.01)
*B60R 13/01* (2006.01)

(52) U.S. Cl.
CPC ............... *B60J 7/104* (2013.01); *B60R 13/01* (2013.01); *B60R 2013/016* (2013.01)

(58) Field of Classification Search
CPC .. B60J 7/104; B60J 7/10; B60R 13/01; B60R 2013/016
USPC .......... 296/39.2, 41, 43, 37.6; 410/106, 110, 410/116
See application file for complete search history.

(56) References Cited

U.S. PATENT DOCUMENTS

| | | | | |
|---|---|---|---|---|
| 3,421,726 A | * | 1/1969 | Getter | B60P 7/0807 296/43 |
| 4,253,785 A | * | 3/1981 | Bronstein | B60P 7/0815 114/218 |
| 4,444,427 A | * | 4/1984 | Martin | B60P 3/42 224/403 |
| 4,815,787 A | * | 3/1989 | Hale | B60P 3/32 296/10 |
| 4,948,311 A | * | 8/1990 | St. Pierre | B60P 7/0807 248/499 |
| 5,058,652 A | * | 10/1991 | Wheatley | B60P 7/04 160/327 |
| 5,141,277 A | * | 8/1992 | Alexander | B60P 7/0807 296/43 |
| 5,228,739 A | | 7/1993 | Love | |
| 5,261,719 A | * | 11/1993 | Tucker | B60J 7/104 224/405 |
| 5,273,382 A | * | 12/1993 | Yearick | F16B 13/066 411/64 |
| 5,360,250 A | * | 11/1994 | Wood | B60P 7/0807 296/39.2 |
| 5,560,666 A | * | 10/1996 | Vieira | B60R 9/00 224/402 |
| 5,584,521 A | * | 12/1996 | Hathaway | B60J 7/104 224/405 |
| 5,704,678 A | * | 1/1998 | Elwell | B60R 13/04 280/770 |

(Continued)

*Primary Examiner* — Gregory Blankenship
(74) *Attorney, Agent, or Firm* — Jason Rogers; Brooks Kushman P.C.

(57) ABSTRACT

A vehicle includes a truck bed side panel, a top cover, a clamp, and a plug. The truck bed side panel has a top defining a stake pocket and an overhang extending from the top. The top cover has an upper surface defining an aperture. The clamp is secured to the top cover and engages the overhang to secure the top cover to the top of the side panel. The plug is disposed within the stake pocket and aperture to prevent slippage of the top cover.

19 Claims, 5 Drawing Sheets

(56) References Cited

U.S. PATENT DOCUMENTS

| | | | | |
|---|---|---|---|---|
| 5,823,601 A | * | 10/1998 | Stanesic | B60R 13/04 280/770 |
| 5,921,603 A | * | 7/1999 | Karrer | B60P 1/54 296/100.17 |
| 6,024,401 A | * | 2/2000 | Wheatley | B60J 7/102 296/100.17 |
| 6,059,159 A | * | 5/2000 | Fisher | B60R 9/00 224/309 |
| 6,176,658 B1 | * | 1/2001 | Rowe | B60P 7/0815 410/101 |
| 6,238,153 B1 | * | 5/2001 | Karrer | B60P 7/0815 296/36 |
| 6,286,884 B1 | * | 9/2001 | Speece | B60R 13/01 280/770 |
| 6,309,006 B1 | * | 10/2001 | Rippberger | B60J 7/104 296/100.16 |
| 6,565,141 B1 | | 5/2003 | Steffens et al. | |
| 6,834,786 B2 | * | 12/2004 | Hansen | B60P 3/122 211/20 |
| 6,913,175 B2 | * | 7/2005 | Martin | B60R 9/00 224/403 |
| 6,948,761 B2 | * | 9/2005 | Haack | B60J 7/102 296/100.16 |
| 7,594,478 B2 | * | 9/2009 | Karnes | B62D 33/0207 116/173 |
| 7,740,431 B1 | | 6/2010 | Baker | |
| 8,157,229 B2 | * | 4/2012 | Palermo | B60P 7/0815 224/403 |
| 9,159,254 B2 | * | 10/2015 | Oyoung | G09F 17/00 |
| 2002/0096902 A1 | * | 7/2002 | Oswald | B60R 13/011 296/39.2 |
| 2003/0085584 A1 | * | 5/2003 | Golden | B60R 13/01 296/39.2 |
| 2006/0091689 A1 | * | 5/2006 | Wilding | B60R 9/00 296/37.6 |
| 2011/0042990 A1 | * | 2/2011 | Holt | B60P 7/0815 296/37.6 |

\* cited by examiner

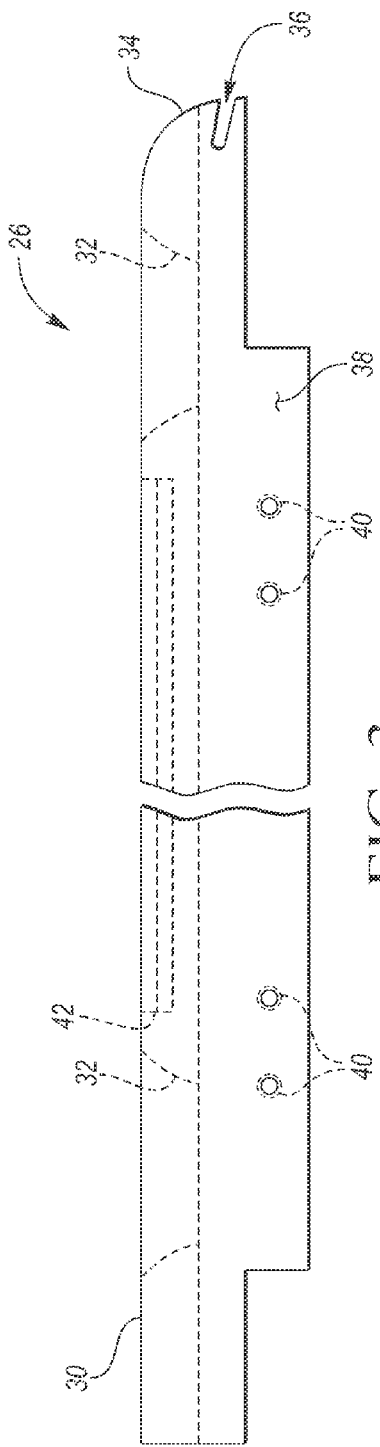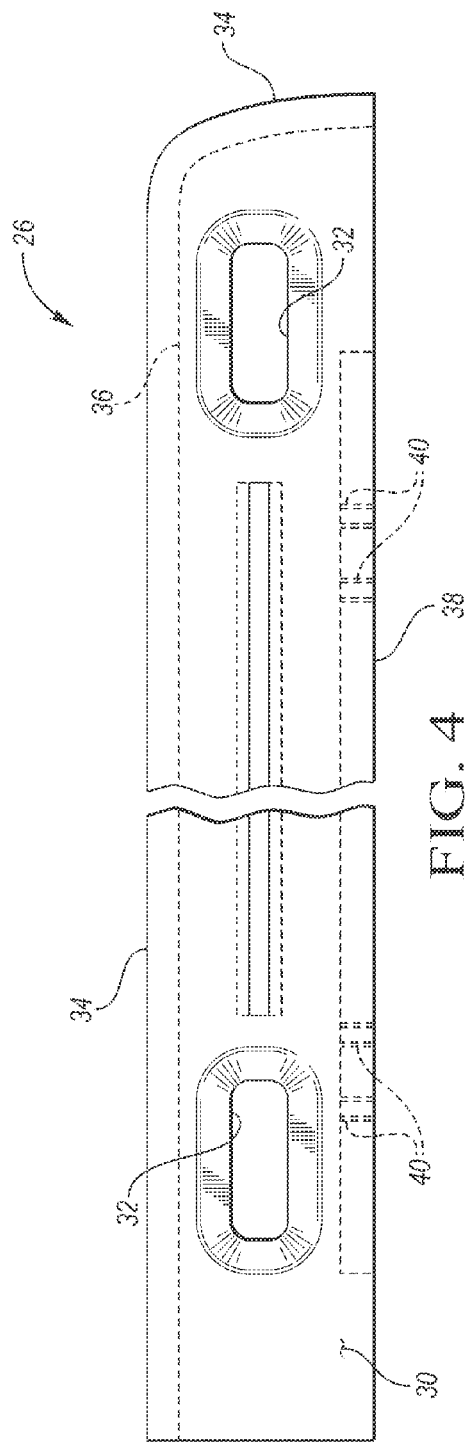

VEHICLE ACCESSORY ATTACHMENT SYSTEM

TECHNICAL FIELD

The present disclosure relates to systems configured to facilitate the attachment of aftermarket accessories to pickup truck beds.

BACKGROUND

A multitude of aftermarket accessories for pickup trucks require altering the side panels of the truck bed to facilitate proper attachment of the accessories to the pickup truck. These alterations often include drilling holes and/or cutting sections out of the side panels, which often compromise the structural integrity of the pickup truck bed and exposes untreated material leading to corrosion.

SUMMARY

A vehicle includes a truck bed side panel, a top cover, a clamp, and a plug. The truck bed side panel has a top defining a stake pocket and an overhang extending from the top. The top cover has an upper surface defining an aperture. The clamp is secured to the top cover and engages the overhang to secure the top cover to the top of the side panel. The plug is disposed within the stake pocket and aperture to prevent slippage of the top cover.

A vehicle accessory attachment device includes a top surface, an external side surface, and a clamp. The top surface defines an aperture that is configured to align with a stake pocket defined by a truck bed side panel. The top surface also defines a T-slot that is configured to receive a T-nut. The external side surface defines a slot configured to receive a tonneau cover. The clamp is configured to engage an overhang on the side panel to secure the attachment device to the side panel.

A vehicle includes a cargo bed floor, a pair of side panels, side panel top covers, clamps, and plugs. The pair of side panels extends upward from the floor. The side panels have top surfaces defining stake pockets and overhangs extending from the top surfaces. The side panel top covers have internal and external peripheral edges and define apertures that align with the stake pockets. The clamps are secured to the internal peripheral edges of the top covers and engage the overhangs to secure the top covers to the top surfaces of the side panels. The plugs are disposed within the stakes pockets and apertures to prevent slippage of the top covers.

BRIEF DESCRIPTION OF THE DRAWINGS

FIG. 3 is a side view of one of the top covers;

FIG. 4 is a top view of one of the top covers;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Attaching aftermarket accessories to trucks may require drilling holes and removing other material from the truck bed in order to properly secure such accessories to the truck bed. Drilling holes and/or removing material from the sheet metal that the truck bed is made from may compromise the integrity of the truck bed structure. The accessory attachment system disclosed herein includes a robust solution for attaching aftermarket accessories to a pickup truck bed without drilling into the sheet metal structure of the bed. Furthermore, the system utilizes the strength of the truck bed side panels to provide support for any aftermarket accessory, while at the same time providing a mechanism to prevent the accessories (and accessory attachment system) from slipping once secured to the side panels of the truck bed.

Figure 1:
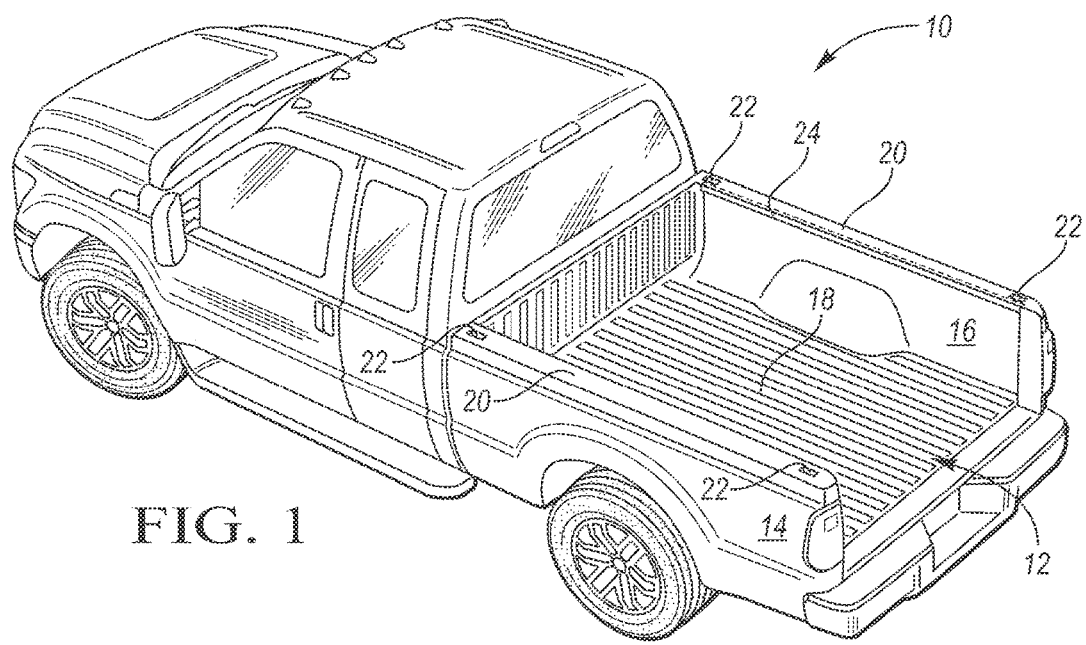
FIG. 1 is a perspective view of a vehicle having a cargo or truck bed.

Referring to FIG. 1, a vehicle 10 is illustrated. The vehicle 10 may be a truck that includes a cargo or truck bed 12. The truck bed 12 may include a first side panel 14 and a second side panel 16. The truck bed 12 may also include a truck bed floor 18 (which may also be referred to as a cargo bed floor) and a tailgate (not shown). The first side panel 14 and second side panel 16 may extend upward from the truck bed floor 18. The components of the truck bed 12, including the first side panel 14, second side panel 16, floor 18, and tailgate, may be made from a sheet metal material, including but not limited to, steel sheet or an aluminum alloy sheet. The first side panel 14 and second side panel 16 may have top surfaces 20 that define stake pockets 22. The stake pockets 22 are through holes that extend through the top surfaces 20. Portions of the first side panel 14 and second side panel 16 (which may be referred as overhangs 24) may extend away and then downward from the top surfaces 20 of the first and second side panels, towards the truck bed floor 18.

Figure 2:
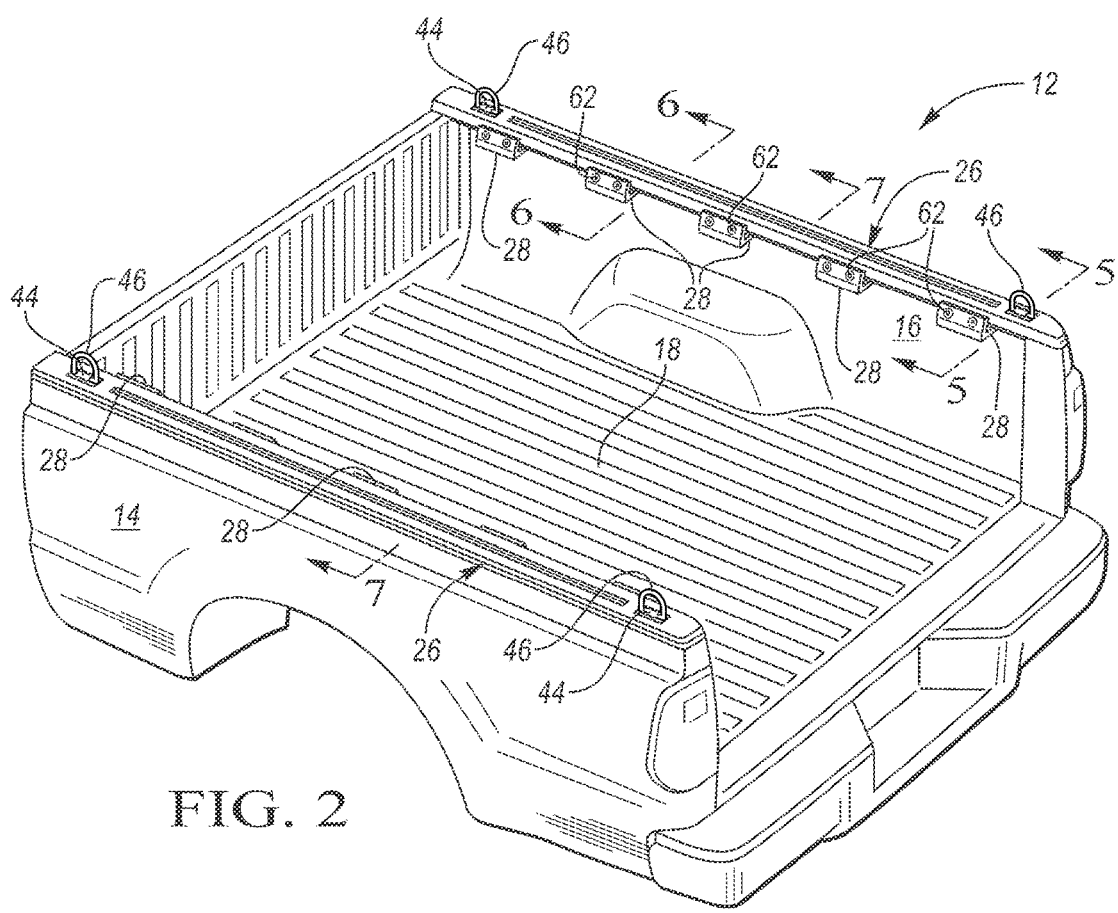
FIG. 2 is a perspective view of the truck bed having top covers disposed on side panels of the truck bed.

Referring to FIG. 2, the truck bed 12 is illustrated. Side panel top covers 26 may be secured to the first side panel 14 and second side panel 16. Specifically, the top covers 26 may be secured to the top surfaces 20 of the first side panel 14 and second side panel 16. The top covers 26 may be configured to provide a variety of attachment mechanisms for various accessories. The top covers 26 may be referred to as truck or vehicle accessory attachment devices. At least one clamp 28 may be secured to the top covers 26. The clamps 28 may be configured to engage the first side panel 14 and second side panel 16 to secure the top covers 26 to the first side panel 14 and second side panel 16. Specifically, the clamps 28 may be configured to secure the top covers 26 to the top surfaces 20 of the first side panel 14 and second side panel 16.

Referring to FIGS. 3 and 4, a side view and a top view of one of the top covers 26 is illustrated. The embodiment in FIGS. 3-6 depicts a right-handed version of the top cover 26 which is secured to the second side panel 16. This disclosure, however, should be construed to include a left-handed version of the top cover 26 which is secured to the first side panel 14. The left-handed version of the top cover 26 may be a minor image of the right-handed version of the top cover 26. The top covers 26 may include upper surfaces 30 that define apertures 32. The apertures 32 may be configured to align with the stake pockets 22. The apertures may also be configured to receive plugs or other accessories.

The top covers 26 may have external side surfaces 34 (which alternatively may be referred to as external peripheral edges) that define slots 36 that are configured to receive a tonneau cover. The tonneau cover may be secured to a pair of top covers 26 by engaging the slots 36 in the pair of top covers 26. The tonneau cover may include hooks, clasps, catches, or other mechanisms that engage the slots 36.

The top covers 26 may also include internal side surfaces 38 (which alternatively may be referred to as internal peripheral edges) that may be located opposite of the external side surfaces 34. The clamps 28 may be secured to the internal side surfaces 38 of the top covers 26. The internal side surfaces 38 of the top covers 26 may define tapped holes 40 that are configured to receive fasteners in order to secure the clamps 28 to the top covers 26. The upper surfaces 30 of the top covers 26 may define T-slots 42 that are configured to receive T-nuts in order to mount a variety of accessories to the top covers 26.

Figure 5:
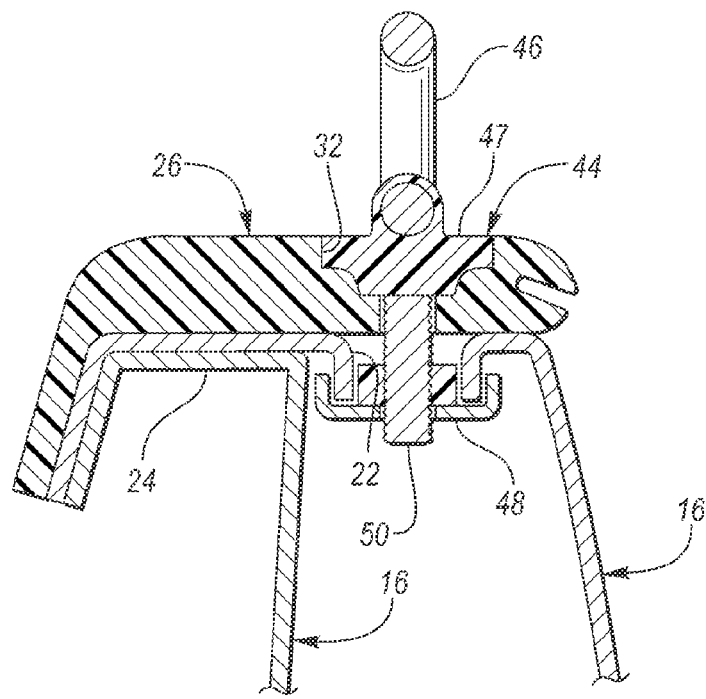
FIG. 5 is cross section taken along line 5-5 in FIG. 2.

Referring now to FIGS. 2 and 5, plugs 44 may be received within the stake pockets 22 and apertures 32 to prevent the top covers 26 from slipping relative to the first side panel 14 and second side panel 16. The plugs 44 may include bullrings 46 that are configured to receive straps, ropes, tie-downs, etc., to secure a load that is disposed within the truck bed 12. The plugs 44 may or may not include accessories such as bullrings 46. The plugs 44 may include top portions 47 that are disposed within and engage the apertures 32 in the top covers 26 and bottom portions 48 that are disposed within and engage the stake pockets 22 in the side panels. The top portions 47 and bottom portions 48 of the plugs 44 may be secured to each other by one or more fasteners 50. One of the top portion 47 and bottom portion 48 of the plugs 44 may have a through hole while the other has a tapped hole. The through hole may be a countersunk hole and the fastener 50 may be a countersunk fastener.

Figure 6:
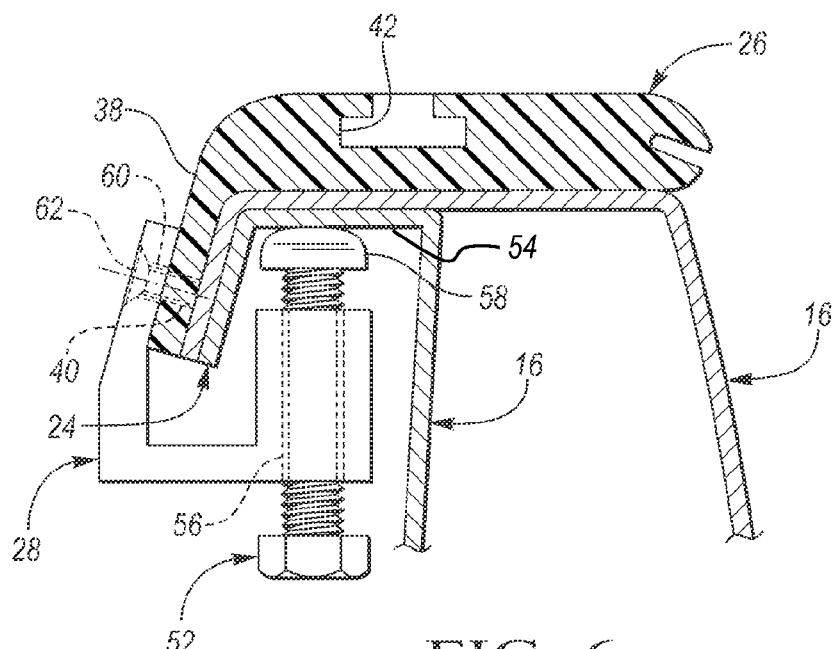
FIG. 6 is cross section taken along line 6-6 in FIG. 2.

Referring now to FIGS. 2 and 6, a clamp 28 that is secured to the top cover 26 and engaging the second side panel 16 is illustrated. The clamp 28 may be a C-clamp. The clamp 28 may include a clamping bolt 52 that engages an underside 54 of the overhang 24 to secure the top cover 26 to the second side panel 16. The clamping bolt 52 may be threaded into a tapped hole 56 that is defined within the clamp 28. The clamping bolt 52 may also include the head portion 58 that engages the underside 54 of the overhang 24. The head portion 58 may be made from a soft plastic or rubber material. The clamp 28 may define through holes 60 that are configured to align with the tapped holes 40 defined by the internal side surfaces 38 of the top covers 26. The clamps 28 may be secured to the top covers 26 by fasteners 62 that pass through the through holes 60 and are threaded into the tapped holes 40. The through holes 60 may be countersunk holes and the fasteners 62 may be countersunk fasteners.

When secured to the first side panel 14 and a second side panel 16, the top covers 26 allow for a variety of accessories to be attached to the first side panel 14 and second side panel 16 of the truck bed 12. For example, the top covers 26 may be configured to secure ladder racks, headache racks, toolboxes, tonneau covers, and/or other accessories to the first side panel 14 and second side panel 16 of the truck bed 12.

Figure 7:
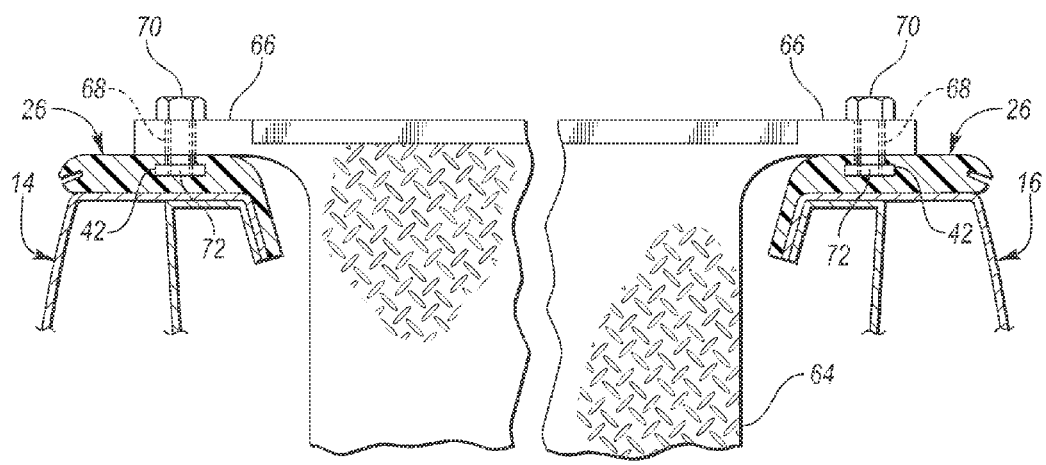
FIG. 7 is cross section taken along line 7-7 in FIG. 2, further depicting a container secured to the top cover.

Referring to FIG. 7, a first example of an accessory that is attached to top covers 26 that are secured to the first side panel 14 and the second panel 16 of the truck bed 12 is illustrated. In the first example a container 64, such as a toolbox or auxiliary fuel tank, is secured to the top covers 26. The container 64 may include flanges 66 that define through holes 68. Fasteners 70 may pass through the through holes 68 and engage T-nuts 72 that are disposed within the T-slots 42 in order to secure the container 64 to the top covers 26.

Figure 8:
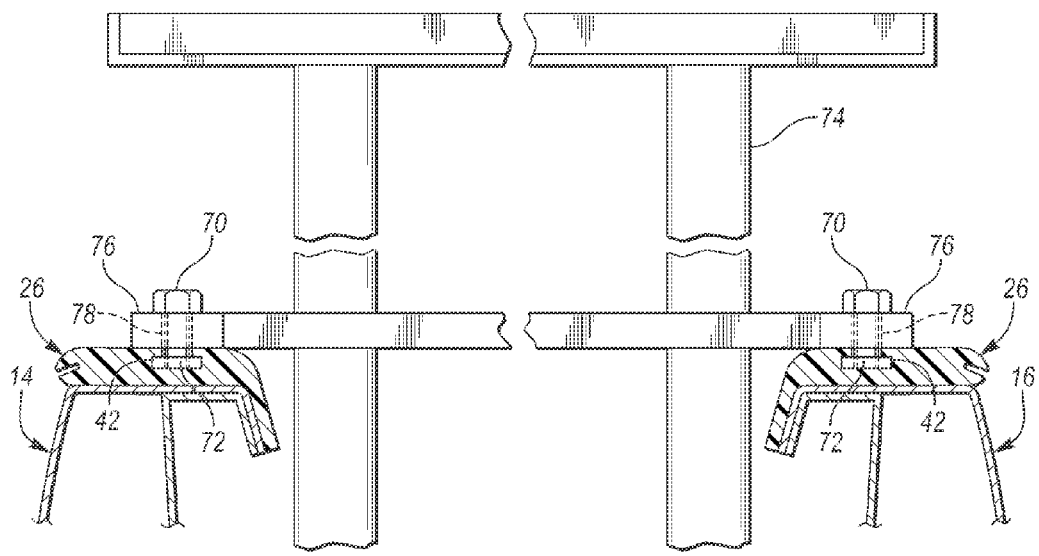
FIG. 8 is an alternative cross section taken along line 7-7 in FIG. 2, further depicting a framing structure secured to the top cover.

Referring to FIG. 8, a second example of an accessory that is attached to top covers 26 that are secured to the first side panel 14 and the second panel 16 of the truck bed 12 is illustrated. In the second example a framing structure 74, such as a ladder rack, is secured to the top covers 26. The framing structure 74 may include flanges 76 that define through holes 78. The fasteners 70 may pass through the through holes 78 and engage the T-nuts 72 that are disposed within the T-slots 42 in order to secure the framing structure 74 to the top covers 26. Although the depicted example shows only one framing structure 74 secured to the top covers 26, the disclosure should be construed to include one or more framing structures 74 secured to the top covers 26. The framing structures may be utilized to transport various objects that may or may not exceed the overall length of the truck bed 12.

Figure 9:
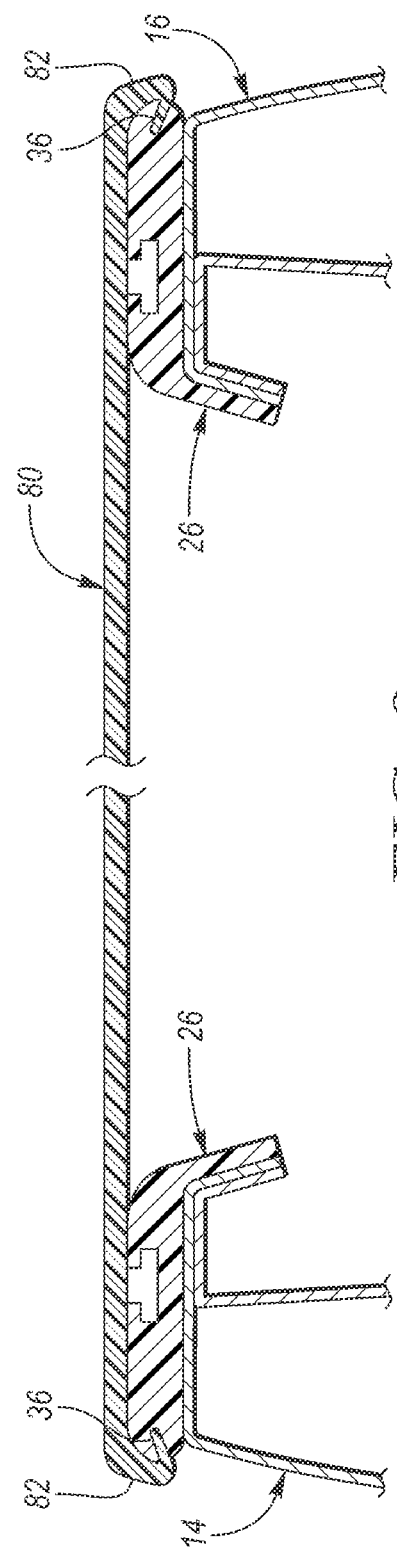
FIG. 9 is an alternative cross section taken along line 7-7 in FIG. 2, further depicting a tonneau cover secured to the top cover.

Referring to FIG. 9, a third example of an accessory that is attached to top covers 26 that are secured to the first side panel 14 and the second panel 16 of the truck bed 12 is illustrated. In the third example a tonneau cover 80 is secured to the top covers 26. The tonneau cover 80 includes hooks or clasps 82 that engage the slots 36 defined by the top covers 26 in order to secure the tonneau cover 80 to the top covers 26.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a truck bed side panel having a top defining a stake pocket, and an overhang extending from the top;
   a top cover having an upper surface defining an aperture and a T-slot configured to receive a T-nut;

a clamp secured to the top cover and engaging the overhang to secure the top cover to the top of the side panel; and a plug disposed within the stake pocket and aperture to prevent slippage of the top cover.

2. The vehicle of claim 1, wherein the top cover further comprises an external side surface that defines a slot configured to receive a tonneau cover.

3. The vehicle of claim 2, wherein the top cover further comprises an internal side surface opposite of the external side surface, and wherein the clamp is secured to the internal side surface.

4. The vehicle of claim 3, wherein the clamp includes a clamping bolt engaging an underside of the overhang to secure the top cover to the top of the side panel.

5. The vehicle of claim 4, wherein the clamp defines a through hole, the internal side surface of the top cover defines a tapped hole, and the clamp is secured to the top cover by a fastener that passes through the through hole and is threaded into the tapped hole.

6. The vehicle of claim 1, wherein the plug includes a bull-ring that extends upward relative to the top cover.

7. A vehicle accessory attachment device comprising:
a top surface defining an aperture configured to align with a stake pocket defined by a truck bed side panel, and a T-slot configured to receive a T-nut;
an external side surface defining a slot configured to receive a tonneau cover; and
a clamp configured to engage an overhang on the side panel to secure the attachment device to the side panel.

8. The vehicle accessory attachment device of claim 7, wherein the clamp includes a clamping bolt configured to engage an underside of the overhang to secure the attachment device to the side panel.

9. The vehicle accessory attachment device of claim 8, further comprising an internal side surface, wherein the clamp defines a through hole, the internal side surface defines a tapped hole, and the clamp is secured to the internal surface by a fastener that passes through the through hole and is threaded into the tapped hole.

10. The vehicle accessory attachment device of claim 7, wherein the aligned aperture and the stake pocket are configured to receive a plug to prevent slippage of the vehicle accessory attachment device relative to side panel.

11. A vehicle comprising:
a cargo bed floor;
a pair of side panels extending upward from the floor, the side panels having top surfaces defining stake pockets and overhangs extending from the top surfaces;
side panel top covers having internal and external peripheral edges, and defining apertures that align with the stake pockets;
clamps secured to the internal peripheral edges of the top covers and engaging the overhangs to secure the top covers to the top surfaces of the side panels; and
plugs disposed within the stakes pockets and apertures to prevent slippage of the top covers.

12. The vehicle of claim 11, wherein the external peripheral edges define slots configured to receive a tonneau cover.

13. The vehicle of claim 12, wherein a tonneau cover engaging the slots is secured to the side panel top covers.

14. The vehicle of claim 11, wherein the clamps include clamping bolts engaging undersides of the overhangs to secure the top covers to the top surfaces of the side panels.

15. The vehicle of claim 14, wherein the clamps define through holes, the internal peripheral edges of the top covers define tapped holes, and the clamps are secured to the top covers by fasteners that pass through the through holes and are threaded into the tapped holes.

16. The vehicle of claim 11, wherein upper surfaces of the top covers define T-slots configured to receive T-nuts.

17. The vehicle of claim 16, wherein a toolbox is secured to the side panel top covers via fasteners engaging T-nuts disposed within the T-slots.

18. The vehicle of claim 16, wherein a ladder rack is secured to the side panel top covers via fasteners engaging T-nuts disposed within the T-slots.

19. The vehicle of claim 11, wherein the plug includes a bull-ring that extends upward relative to the top cover.

\* \* \* \* \*